(12) United States Patent
Najdenkoska et al.

(10) Patent No.: US 12,579,184 B2
(45) Date of Patent: Mar. 17, 2026

(54) METHOD AND SYSTEM FOR IMAGE CATEGORIZATION USING A VISUAL LANGUAGE MODEL

(71) Applicant: INCEPTION INSTITUTE OF ARTIFICIAL INTELLIGENCE, LTD., Abu Dhabi (AE)

(72) Inventors: Ivona Najdenkoska, Amsterdam (NL); Mohammad Derakhshani, Amsterdam (NL); Yuki Asano, Amsterdam (NL); Cees Snoek, Volendam (NL); Marcel Worring, Amsterdam (NL)

(73) Assignee: INCEPTION AI IP LTD, Abu Dhabi (AE)

( * ) Notice: Subject to any disclaimer, the term of this patent is extended or adjusted under 35 U.S.C. 154(b) by 275 days.

(21) Appl. No.: 18/470,526

(22) Filed: Sep. 20, 2023

(65) Prior Publication Data

US 2025/0094482 A1     Mar. 20, 2025

(51) Int. Cl.
*G06F 16/55* (2019.01)
*G06V 10/762* (2022.01)
*G06V 20/70* (2022.01)

(52) U.S. Cl.
CPC ............ *G06F 16/55* (2019.01); *G06V 10/762* (2022.01); *G06V 20/70* (2022.01)

(58) Field of Classification Search
CPC ....... G06F 16/55; G06V 10/762; G06V 20/70
See application file for complete search history.

(56) References Cited

PUBLICATIONS

Tsimpoukelli, Maria, et al. "Multimodal Few-Shot Learning with Frozen Language Models." arXiv preprint arXiv:2106.13884 (2021). https://arxiv.org/abs/2106.13884 (Year: 2021).*
Ji, Xu, João F. Henriques, and Andrea Vedaldi. "Invariant Information Clustering for Unsupervised Image Classification and Segmentation." arXiv preprint arXiv: 1807.06653 (2019).https://arxiv.org/abs/1807.06653 (Year: 2019).*
Cao, Jize, et al. "Behind the scene: Revealing the secrets of pre-trained vision-and-language models." European Conference on Computer Vision. Cham: Springer International Publishing, 2020. https://link.springer.com/chapter/10.1007/978-3-030-58539-6_34 (Year: 2020).*
Ucar, Talip, et al. "One-shot learning for language modelling." arXiv preprint arXiv:2007.09679 (2020).https://arxiv.org/abs/2007.09679 (Year: 2020).*

(Continued)

*Primary Examiner* — Han Hoang
(74) *Attorney, Agent, or Firm* — Tucker Ellis LLP; Ross M. Kowalski

(57) ABSTRACT

Methods, systems, and techniques for image categorization using a visual language model. A set of images is clustered into clusters respectively corresponding to differently categorized objects. Names are respectively assigned to the clusters, and image captions are respectively generated for the clusters using the names. The image captions and respective images represent image-text pairs. Those image-text pairs are input to the visual language model as context for a query. The query is then input to the visual language model. The query includes a request to categorize a query image of a class represented in the context. In response to the query, the visual language model performs an open-ended generative categorization of the query image.

19 Claims, 5 Drawing Sheets

(56) References Cited

PUBLICATIONS

Xie, Junyuan, Ross Girshick, and Ali Farhadi. "Unsupervised Deep Embedding for Clustering Analysis." arXiv preprint arXiv:1511. 06335 (2015).https://arxiv.org/abs/1511.06335 (Year: 2015).*

Noroozi, Mehdi, et al. "Boosting Self-Supervised Learning via Knowledge Transfer." arXiv preprint arXiv:1805.00385 (2018). https://arxiv.org/abs/1805.00385 (Year: 2018).*

Katz, Andrew, Umair Shakir, and Ben Chambers. "The utility of large language models and generative AI for education research." arXiv preprint arXiv:2305.18125 (2023).https://arxiv.org/abs/2305. 18125 (Year: 2023).*

Han, Kai, et al. "What's in a Name? Beyond Class Indices for Image Recognition." arXiv preprint arXiv:2304.02364 (2023).https://arxiv. org/abs/2304.02364 (Year: 2023).*

Bossard, Lukas et al., "Food-101—Mining Discriminative Components with Random Forests," 16 pages.

Bojanowski, Piotr et al., "Unsupervised Learning by Predicting Noise," 10 pages, arXiv:1704.05310v1 [stat.ML], Apr. 18, 2017.

Asano, Yuki M. et al., "Self-Labelling Via Simultaneous Clustering and Representation Learning," University of Oxford, 22 pages, ICLR 2020, arXiv: 1911.05371v3 [cs.CV], Feb. 19, 2020.

Asano, Yuki M. et al., "Labelling unlabelled videos from scratch with multi-modal self-supervision," NeurIPS 2020, 15 pages, arXiv:2006.13662v3 [cs. CV], Feb. 28, 2021.

Alayrac, Jean-Baptiste et al., "Flamingo: a Visual Language Model for Few-Shot Learning," NEURLPS 2022, 54 pages, arXiv:2204. 14198v2 [cs.CV], Nov. 15, 2022.

Abadi, Martin et al., "TensorFlow: Large-Scale Machine Learning on Heterogeneous Distributed Systems," 19 pages, arXiv:1603. 04467v2 [cs. DC], Mar. 16, 2016.

"SeCAt: Self-Context Adaptation of Small Visual Language Models," NeurIPS 2023, 13 pages.

Yang, Kevin et al., "Re: Generating Longer Stories With Recursive Reprompting and Revision," UC Berkeley, 86 pages, arXiv:2210. 06774v3 [cs.CL], Oct. 22, 2022.

Yang, Jianwei et al., "Joint Unsupervised Learning of Deep Representations and Image Clusters," Virginia Tech, 19 pages, arXiv:1604. 03628v3 [cs.CV], Jun. 20, 2016.

Yang, Antoine et al., "Zero-Shot Video Question Answering via Frozen Bidirectional Language Models," PSL Research University, 25 pages, arXiv:2206.08155v2 [cs.CV], Oct. 10, 2022.

Xie, Junyuan et al., "Unsupervised Deep Embedding for Clustering Analysis," 10 pages, arXiv:1511.06335v2 [cs.LG], May 24, 2016.

Xiao, Jianxiong et al., "SUN Database: Large-scale Scene Recognition from Abbey to Zoo," Massachusetts Institute of Technology, Brown University, 8 pages.

Wolf, Thomas et al., "Transformers: State-of-the-Art Natural Language Processing," Hugging Face, Brooklyn, USA, pp. 38-45, Nov. 16-20, 2020.

Wei, Jerry et al., "Larger Language Models Do In-Context Learning Differently," 51 pages, arXiv:2303.03846v2 [cs.CL], Mar. 8, 2023.

Wei, Jason et al., "Chain-of-Thought Prompting Elicits Reasoning in Large Language Models," 43 pages, arXiv:2201.11903v6 [cs. CL], Jan. 10, 2023.

Wei, Jason et al., "Emergent Abilities of Large Language Models," Transactions on Machine Learning Research, Aug. 2022, 30 pages, arXiv:2206.07682v2 [cs.CL], Oct. 26, 2022.

Wei, Jason et al., "Finetuned Language Models Are Zero-Shot Learners," ICLR 2022, 46 pages, arXiv:2109.01652v5 [cs.CL], Feb. 8, 2022.

Wang, Wenhui et al., "Image as a Foreign Language: BEIT Pretraining for All Vision and Vision-Language Tasks," 18 pages, arXiv:2208. 10442v2 [cs.CV], Aug. 31, 2022.

Welinder, Peter et al., "The MultidimensionalWisdom of Crowds," 9 pages.

Gansbeke, Wouter Van et al., "SCAN: Learning to Classify Images without Labels," 26 pages, arXiv:2005.12320v2 [cs.CV], Jul. 3, 2020.

Tsimpoukelli, Maria et al., "Multimodal Few-Shot Learning with Frozen Language Models," 19 pages, arXiv:2106.13884v2 [cs.CV], Jul. 3, 2021.

Tay, Yi et al., "Transcending Scaling Laws with 0.1% Extra Compute," 21 pages, arXiv:2210.11399v2 [cs.CL], Nov. 16, 2022.

Tan, Bowen et al., "Progressive Generation of Long Text with Pretrained Language Models," 12 pages, arXiv:2006.15720v2 [cs. CL], Apr. 14, 2021.

Smith, Shaden et al., "Using DeepSpeed and Megatron to Train Megatron-Turing NLG 530B, A Large-Scale Generative Language Model," 44 pages, arXiv:2201.11990v3 [cs.CL], Feb. 4, 2022.

Sharma, Piyush et al., "Conceptual Captions: A Cleaned, Hypernymed, Image Alt-text Dataset For Automatic Image Captioning," pp. 2556-2565, Venice, California.

Saharia, Chitwan et al., "Photorealistic Text-to-Image Diffusion Models with Deep Language Understanding," 46 pages, arXiv:2205. 11487v1 [cs.CV], May 23, 2022.

Ramesh, Aditya et al., "Zero-Shot Text-to-Image Generation," 20 pages, arXiv:2102.12092v2 [cs.CV], Feb. 26, 2021.

Rae, Jack W., et al., "Scaling Language Models: Methods, Analysis & Insights from Training Gopher," DeepMind 2021, 120 pages, arXiv:2112.11446v2 [cs.CL], Jan. 21, 2022.

Radford, Alec et al., "Learning Transferable Visual Models From Natural Language Supervision," 48 pages, arXiv:2103.00020v1 [cs.CV], Feb. 26, 2021.

Parkhi, Omkar M. et al., "Cats and Dogs," IEEE Xplore, pp. 3498-3505, 2012.

Noroozi, Mehdi et al., "Boosting Self-Supervised Learning via Knowledge Transfer," 9 pages, arXiv:1805.00385v1 [cs.CV], May 1, 2018.

Nilsback, Maria-Elena et al., "Automated flower classification over a large No. of classes," Visual Geometry Group, Department of Engineering Science, University of Oxford, UK, 8 pages.

Najdenkoska, Ivona et al., "Meta Learning To Bridge Vision and Language Models for Multimodal Few-Shot Learning," ICLR 2023, University of Amsterdam, NL, 13 pages, arXiv:2302.14794v1 [cs. CV], Feb. 28, 2023.

Mokady, Ron et al., "ClipCap: CLIP Prefix for Image Captioning," The Blavatnik School of Computer Science, Tel Aviv University, 10 pages, arXiv:2111.09734v1 [cs.CV], Nov. 18, 2021.

Merullo, Jack et al., "Linearly Mapping From Image to Text Space," ICRL 2023, 35 pages, arXiv:2209.15162v3 [cs.CL], Mar. 9, 2023.

Melas-Kyriazi, Luke et al., "Deep Spectral Methods: A Surprisingly Strong Baseline for Unsupervised Semantic Segmentation and Localization," University of Oxford, UK, 25 pages.

Lu, Yao et al., "Fantastically Ordered Prompts and Where to Find Them: Overcoming Few-Shot Prompt Order Sensitivity," 13 pages, arXiv:2104.08786v2 [cs.CL], Mar. 3, 2022.

Liu, Jiachang et al., "What Makes Good In-Context Examples for GPT-3?," 12 pages, arXiv:2101.06804v1 [cs.CL], Jan. 17, 2021.

Li, Junnan et al., "BLIP-2: Bootstrapping Language-Image Pretraining with Frozen Image Encoders and Large Language Models," 13 pages, arXiv:2301.12597v3 [cs.CV], Jun. 15, 2023.

Kuhn, H.W., "The Hungarian Method for the Assignment Problem," Bryn Mawr College, 15 pages.

Koh, Jing Yu et al., "Grounding Language Models to Images for Multimodal Inputs and Outputs," 18 pages, arXiv:2301.13823v4 [cs.CL], Jun. 13, 2023.

Kingma, Diederik P. et al., "Adam: a Method for Stochastic Optimization," ICLR 2015, 15 pages, arXiv:1412.6980v9 [cs.LG], Jan. 30, 2017.

Johnson, Jeff et al., "Billion-scale similarity search with GPUs," 12 pages, arXiv: 1702.08734v1 [cs.CV], Feb. 28, 2017.

Jia, Chao et al., "Scaling Up Visual and Vision-Language Representation Learning With Noisy Text Supervision," 14 pages, arXiv:2102. 05918v2 [cs.CV], Jun. 11, 2021.

Ji, Xu et al., "Invariant Information Clustering for Unsupervised Image Classification and Segmentation," 10 pages, arXiv:1807. 06653v4 [cs.CV], Aug. 22, 2019.

Jaegle, Andrew et al., "Perceiver IO: A General Architecture for Structured Inputs & Outputs," ICLR 2022, 29 pages, arXiv:2107. 14795v3 [cs.LG], Mar. 15, 2022.

(56)        References Cited

PUBLICATIONS

Huang, Shaohan et al., "Language Is Not All You Need: Aligning Perception with Language Models," 26 pages, arXiv:2302.14045v2 [cs.CL], Mar. 1, 2023.
Hoffmann, Jordan et al., "Training Compute-Optimal Large Language Models," DeepMind, 2023, 36 pages, arXiv:2203.15556v1 [cs.CL], Mar. 29, 2022.
Hao, Yaru et al., "Language Models are General-Purpose Interfaces," 32 pages, arXiv:2206.06336v1 [cs.CL], Jun. 13, 2022.
Gavrilyuk, Kirill et al., "Motion-Augmented Self-Training for Video Recognition at Smaller Scale," 14 pages, arXiv:2105.01646v1 [cs.CV], May 4, 2021.
Gao, Leo et al., "The Pile: An 800GB Dataset of Diverse Text for Language Modeling," EleutherAI, 39 pages, arXiv:2101.00027v1 [cs.CL], Dec. 31, 2020.
Dai, Zihang et al., "Transformer-XL: Attentive Language Models Beyond a Fixed-Length Context," 20 pages, arXiv:1901.02860v3 [cs.LG], Jun. 2, 2019.
Chowdhery, Aakanksha et al., "PaLM: Scaling Language Modeling with Pathways," Google Research, 87 pages, arXiv:2204.02311v5 [cs.CL], Oct. 5, 2022.
Chan, Stephanie C.Y. et al., "Data Distributional Properties Drive Emergent In-Context Learning in Transformers," 18 pages, arXiv:2205.05055v6 [cs.LG], Nov. 17, 2022.
Caron, Mathilde et al., "Deep Clustering for Unsupervised Learning of Visual Features," 30 pages, arXiv: 1807.05520v2 [cs.CV], Mar. 18, 2019.
Brown, Tom B. et al., "Language Models are Few-Shot Learners," OpenAI, 75 pages, arXiv:2005.14165v4 [cs.CL], Jul. 22, 2020.

* cited by examiner

METHOD AND SYSTEM FOR IMAGE CATEGORIZATION USING A VISUAL LANGUAGE MODEL

TECHNICAL FIELD

The present disclosure is directed at methods, systems, and techniques for image categorization using a visual language model and, in particular, using small visual language models.

BACKGROUND

Large language models have garnered substantial attention within the natural language processing (NLP) community due to their capacity to generate extensive text as well as their remarkable capabilities for in-context learning (ICL). Achieving these capabilities often requires scaling Transformer-based models, augmenting pre-training data, and different loss functions. The ICL paradigm was first introduced by OpenAI™'s GPT3 as a training-free learning framework, allowing large-scale pre-trained language models to adapt to downstream tasks.

Numerous works have further explored ICL and showcased that it makes it easier to incorporate outside knowledge into language models by changing context and templates and exploit it as an interpretable interface to communicate with large language models. Yet, ICL usually comes with the cost of parameter and pre-training dataset scaling. For instance, GPT3 consists of 175 B parameters and is trained on approximately 45 TB of text data.

The field of vision and language understanding has undergone significant advancements with the emergence of large language models. In recent studies, the integration of pre-trained unimodal vision models and language models has been investigated to address the disparity between visual and textual modalities; the integrated model is a "visual language model".

SUMMARY

According to a first aspect, there is provided a method for image categorization using a visual language model, the method comprising: clustering a set of images into clusters respectively corresponding to differently categorized objects; respectively assigning names to the clusters; respectively generating image captions for the clusters using the names, wherein the image captions and respective images comprise image-text pairs; inputting the image-text pairs to the visual language model as context for a query; and inputting the query to the visual language model, wherein the query comprises a request to categorize a query image of a class represented in the context and wherein the visual language model performs an open-ended generative categorization of the query image in response to the query.

The visual language model may be a small-scale visual language model. For example, the visual language model may have fewer than 2 billion parameters. In particular, for example, the visual language model may have between approximately 124 million parameters and approximately 1.3 billion parameters. As another example, the visual language model may have approximately 355 million parameters.

The names may be semantically unrelated to each other.

The names may, for example, be nonsense words, random numbers, or random nouns.

Generating the image captions may be performed in a self-supervised manner.

The clustering may comprise: generating visual embeddings of the set of images; and applying k-means clustering to the visual embeddings.

Generating the image captions may comprise: respectively generating visual embeddings of centroids of the clusters using a vision encoder; generating word embeddings of the names of the clusters, wherein the word embeddings represent the names in a language model tokenspace; and using a cost function to match the centroid from each of the clusters to the names based on the visual embeddings of the centroids and the word embeddings, wherein the images of any one of the clusters share one of the names.

The image captions for the different clusters may comprise a text string shared by all the clusters.

The image captions may respectively comprise the text string and the names appended together, and the query may comprise the text string.

The visual language model may comprise a vision encoder and a language mode, inputting the image-text pairs to the visual language model may comprise part of training the visual language model, and parameters of the vision encoder may be frozen during the training and parameters of the language model may be adjusted during the training.

The context may comprise a sequence of interleaved pairs of the images and corresponding ones of the captions.

The context may further comprise tokens denoting positions of the images and the captions in the sequence.

The context may comprise a plurality of i-way j-shot tasks based on the clusters, and similarity between the clusters of each of the tasks may vary over the tasks.

The context may comprise a plurality of i-way j-shot tasks based on the clusters, and j may vary over the tasks.

According to another aspect, there is provided a system for image categorization using a visual language model, the system comprising: at least one database having stored thereon a set of images; at least one processor communicatively coupled to the at least one database; and at least one non-transitory computer readable medium having stored thereon computer program code that is executable by at least one processor and that, when executed by the at least one processor, causes the at least one processor to perform the foregoing method.

According to another aspect, there is provided at least one non-transitory computer readable medium having stored thereon computer program code that is executable by at least one processor and that, when executed by the at least one processor, causes the at least one processor to perform the foregoing method.

This summary does not necessarily describe the entire scope of all aspects. Other aspects, features and advantages will be apparent to those of ordinary skill in the art upon review of the following description of specific embodiments.

BRIEF DESCRIPTION OF THE FIGURES

In the accompanying drawings, which illustrate one or more example embodiments.

DETAILED DESCRIPTION

Language models have witnessed major advancements in the past years, empowered by large-scale pre-training on massive web-scraped datasets. These large models demonstrate an emergent ability referred to as "in-context learning", where few-shot learning tasks are solved without gradient-based updates based on context samples provided via a prompt. Recently, such models have evolved from the natural language processing domain to visual language models (VLMs) such as Frozen and Flamingo [2]. Yet, such models heavily rely on incorporating very large, proprietary language models, ranging from 7 up to 70 billion parameters, making them impractical for specific downstream tasks.

As of yet, in-context learning abilities have not been observed in small-scale models. One reason is that these small-scale models rely heavily on semantic priors created during the pre-training and they cannot properly digest in-context prompts. For example, if one prompts a small model with a few pairs of input-label mappings as context followed by a query image, using new semantically-unrelated labels, the small model will stick to its semantic priors and will not adjust its predictions. Larger models, by contrast, override these priors, allowing them to learn directly from input-label mappings presented in the context, with no further gradient-based updates. This behavior is attributed to their enhanced capacity and complexity which enable them to easily capture patterns and dependencies within the presented context.

At least some of the embodiments described herein are directed at also teaching small VLMs to capture patterns in context, similar to the behavior observed in large VLMs. The embodiments described herein may also be applied to large VLMs, however, to improve their in-context learning performance. Accordingly, the embodiments described herein are directed at improving in-context learning abilities of VLMs, which for certain small VLMs includes largely unlocking those abilities.

Figure 1:
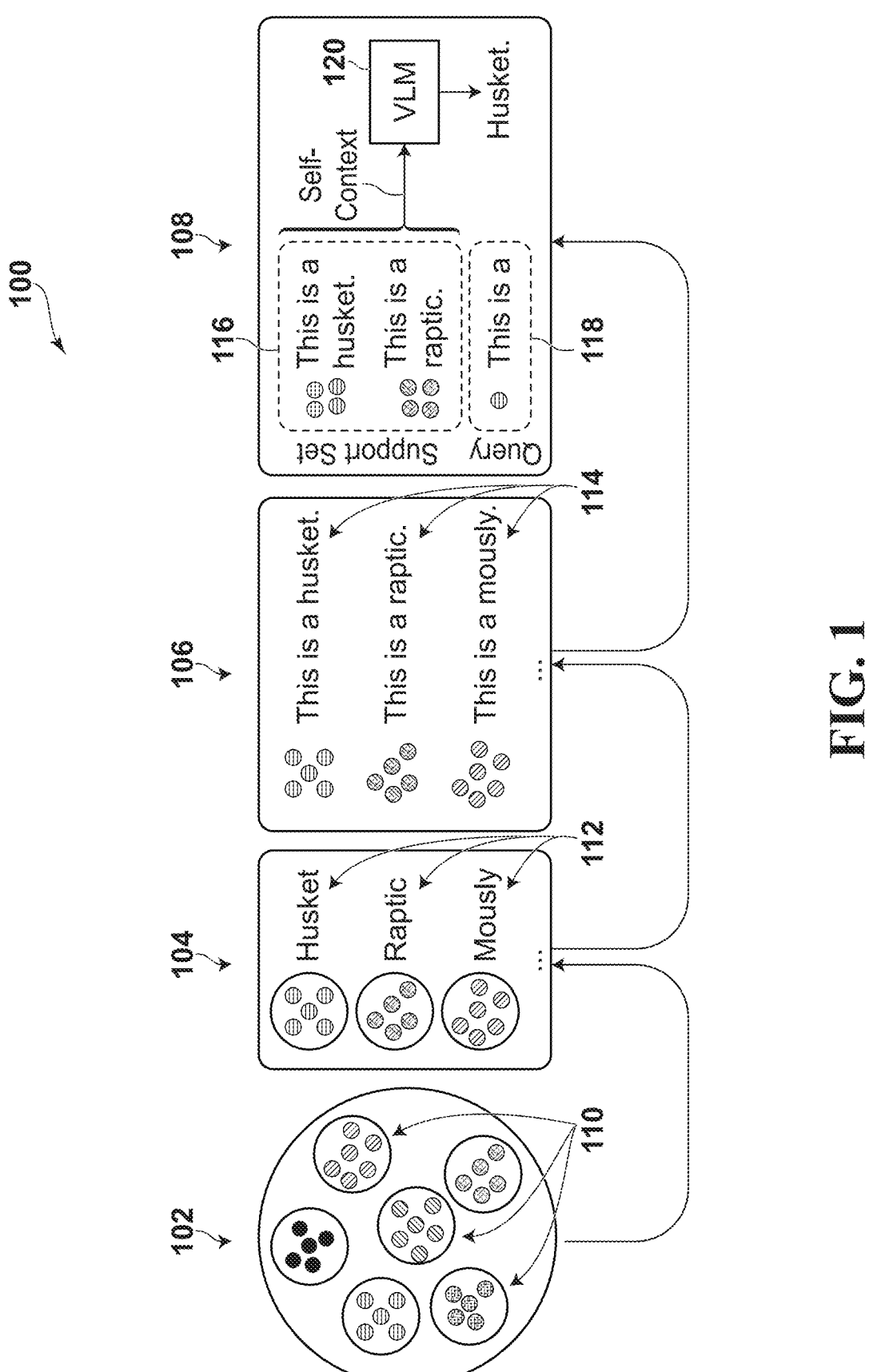
FIG. 1 depicts a method for image categorization using a visual language model, according to an example embodiment.

FIG. 1 depicts a method 100 ("in-context learning adaptation method 100" or "ICL adaptation method 100") for image categorization using a VLM 120, according to an example embodiment. The ICL adaptation method 100 of FIG. 1 comprises:

1. Deep Image Clustering 102. When performing deep image clustering, the method 100 comprises clustering a set of images into clusters 110 respectively corresponding to differently categorized objects. Example objects comprise, animals, people, and vehicles. Clustering may be supervised or unsupervised, or done manually. For example, clustering may be performed by applying k-means clustering.
2. Cluster Selection and Name Assignment 104. Following deep image clustering, a given number of clusters are selected and names 112 are respectively assigned to them. These names 112 may be semantically unrelated to each other and may also be nonce or invented terms, as depicted in FIG. 1 where the names 112 are "husket", "raptic", and "mously".
3. Imitating Captions 106. After name assignment, image captions 114 are respectively generated for the clusters 110 using the names 112. The image captions 114 may comprise a text string, which is "This is a" in FIG. 1, appended to the names 112. The images of the clusters 110 paired with their corresponding image captions 114 are referred to as "image-text pairs".
4. Training with Self-Context 108. After the captions 106 are generated, they and a query 118 are input to a VLM 120. The image-caption pairs comprise a support set that is context 116 for the query 118. In embodiments in which the image captions 114 are generated in a self-supervised manner as in FIG. 1, this represents a "self-context" adaptation of the VLM 120, where the term "self-context" is used because of the self-supervised nature of caption generation. However, in at least some other embodiments, the image captions 114 may be alternatively generated, such as in a supervised manner, semi-supervised manner, unsupervised manner, or manually. As discussed further below, the query 118 comprises a query image of a class represented in the context 116, and the VLM 120 performs an open-ended generative categorization on the query image in response to the query 118. During training, the parameters (i.e., weights and biases) of the language model comprising part of the VLM 120 may be adapted; however, the parameters of the vision encoder aspect of the VLM 120 are frozen.

More particularly, in the embodiments depicted in FIGS. 2 to 5 and discussed further below, a pre-trained image captioning model is the starting point, and this model 120 is converted into an in-context learner able to digest multimodal context. First, an unlabelled image dataset is clustered, and a subset of the resulting clusters 110 is selected. This is followed by assigning semantically-unrelated names as cluster labels (i.e., the names 112) to the selected clusters 110. The usage of such names 112 for clusters 110 gives flexibility because any word can be used for learning the patterns in a prompt. This can be viewed as using arbitrary symbols for creating a context in a self-supervised manner. Then, captions 114 are generated for images by converting these words into "This is a+ cluster name" captions, which end up with either random or totally nonsensical meanings with respect to the image content. After getting such pseudo-captions, the "self-context" is constructed, which contains interleaved self-supervised image-caption pairs as context. Then, the VLM 120 is adapted with mini-batches of these self-contexts, where the VLM 120 leverages the benefit of in-context learning to generate the caption for the query image given the context sequence. These actions represent an example lightweight adaptation method, of which an example is the ICL adaptation method 100 of FIG. 1.

At inference time, the vision and language backbones of the VLM 120 are kept frozen and the VLM 120 is prompted with multimodal contexts to perform open-ended generative categorization of images. In the examples described herein, the multimodal few-shot datasets based on miniImageNet proposed in are used, although different datasets may be used in different embodiments. Furthermore, to test the ability of the VLM to deal with different levels of task granularity, experiments are performed and described in respect of semantically-easy and hard few-shot tasks based on five common vision datasets. The results show that the flexibility of constructing self-contexts provides the opportunity to control the difficulty and granularity of the few-shot tasks. Experiments also show that the ICL adaptation method 100 can turn even small VLMs 120 of the order of 1 billion parameters into strong in-context learners, without any supervised fine-tuning.

In summary, the various embodiments described herein represent an efficient framework for improving in-context learning of VLMs 120, and in particular for unlocking in-context learning in small VLMs 120. Particularly, image clusters 110 are used, and semantically-unrelated words are employed as cluster labels (i.e., names 112) as an intermediate action toward improving in-context abilities. In at least some embodiments, this may be done in a self-supervised manner by defining self-supervised adaptation procedure to learn an in-context template with the semantically-unrelated words for VLMs 120. Experiments on several multimodal few-shot datasets are performed and described, ranging from coarse to fume-grained tasks, which show that the ICL adaptation method 100 applied to relatively small VLMs 120 can result in their outperforming larger visual-language counterparts.

Methodology

To equip small VLMs 120 with the ability of multimodal in-context learning, a self-supervised adaptation technique is applied that mimics the final in-context learning objective, yet does not rely on any labeled or captioned data.

At a high level, the ICL adaptation method 100 clusters a large pool of images to identify highly coherent groups and assigns them names that do not necessarily fit or describe the content. This noisy set of images and names is then used for adapting the VLM 120 in a manner that simulates in-context learning. The ICL adaptation method 100 allows for controlling the context difficulty by sampling items from distant or close clusters and by doing so allows the final VLM 120 to work well even for fine-grained in-context learning.

Few-shot in-context learning is aiming to generate the correct caption $t_q$ corresponding to a query image $x_q$ given samples of paired images $x_s$ and captions $t_s$ in a support-set $s \in S$.

$$f(\{(x_s, t_s)\}s \in S, x_q) = t_q \qquad (1)$$

In order for the VLM 120 to "learn" from the context, the support-set S contains the class of the query 118. More specifically, in the case of utilizing a language model as a decoder f, the task is "open-ended", i.e., $t_q$ is obtained via text generation, and not via classification into a fixed set of labels. A VLM can be trained with this objective, be it that this leverages access to a set of paired image-text data, as evident from Eq. (1). Instead of obtaining supervised sets of image-text pairs, the ICL adaptation method 100 mimics this data using self-supervision and uses the generated image-text pairs to fine tune the VLM f.

The architecture used in the ICL adaptation method 100 is based on image captioning encoder-decoder models. In these models, such as ClipCap [11], f is simply a pipeline that first embeds an image with a vision encoder $\Psi$ and then maps it into the representation space of a language model (LM), i.e., $f=LM(\Psi(x))$. To perform this mapping, it uses a mapping function implemented as a simple multi-layer perceptron, which outputs the visual embeddings as a visual prefix for the language model.

Generating Image-Caption Pairs

Let h:x→c define the human annotation process of classifying an image x in a dataset X into class $c \in C$ of a classification system C. h is replaced by a composition of two unsupervised functions, $h \approx c \odot m$. The first component c, first clusters the dataset X in a self-supervised manner. For this, the visual embeddings obtained by a visual encoder $\phi$ are used, and the whole dataset is clustered, as:

$$c(x) = k - \text{means}_K[\{\phi(x')\}_{x' \in X}](x), \qquad (2)$$

where K is the number of clusters and the resulting output of c is a one-hot encoding indicating the cluster ID for a given image. Next, each ID is assigned to a piece of text to obtain the paired data.

To arrive at pairings of captions to a given image cluster 110 k, a vocabulary of words $w \in V$, that do not need to contain words semantically related to the images in the clusters 110 is used (indeed, as shown below a list of random names suffices for this). Next, the VLM 120 f for the cluster name 112 assignment is used, i.e., the matching step. To match the words with clusters 110, one example image per cluster 110, namely the cluster centroid, is embedded with $\Psi$, and the vocabulary words are embedded into their language model token-space using the tokenizer-embedding function $\tau$. Both $\Psi(x)$ and $\tau(w)$ are in the same embedding space, so a similarity matrix S may be constructed by comparing the cosine-similarities:

$$S_{xw} = sim(\Psi(x), \tau(w)). \qquad (3)$$

As some words yield multiple token embeddings, the maximum similarity is kept to arrive at the matrix $S \in R^{K \times |V|}$. Each image cluster 110 is then matched with a word embedding by using the Kuhn-Munkres (Hungarian) algorithm [9] to reduce, and ideally minimize, the overall cost. The matching function in takes this output and yields the assigned word given a cluster ID. Afterward, the captions are imitated by converting these cluster names 112 into "This is a+cluster name" captions and are paired with all images belonging to the particular cluster 112.

Self-Context Construction

To construct an interleaved sequence of self-context samples, images according to their cluster membership are randomly picked during the mini-batch construction. By choosing the level of similarity between two or more clusters 110, from which the support-set is constructed, the difficulty of the problem can be controlled. This provides the flexibility of the VLM 120 to be adapted for more specific data sets, usually with more fine-grained data samples. For a given cluster 110 k, items $(x_i, t_i)$s. t. $c(x_i)=k$ are sampled, which represent an image-caption pair belonging to the self-context.

Optionally, the difficulty of the few-shot tasks may be varied depending on the proximity between cluster centroids. This means that if two clusters 110 are far away from each other, they create an "easy" self-context. In contrast, if they are more closely then they create a "hard" self-context since the image samples from closer clusters have potentially more visual similarities between each other, rather than distant clusters.

Mixed Self-Context Learning & Inference

Given the input-caption mappings $(x_s, t_s)$ as a self-context, and the query image $(x_q)$, the learning process is performed by optimizing the cross-entropy loss, while generating the query caption $(t_q)$, as:

$$L = H(f\{(x_s, t_s)\}_{s \in S'}, x_q | t_q) \qquad (4)$$

The loss function uses the constructed self-context as a single data point. To encourage generalization with one VLM 120 across different multimodal few-shot settings, mixed self-context learning is performed, where the context length is randomly varied within a batch. This means that the number of samples in the context 116 is changed by taking into account 2-way and j-shot tasks alternately, where $j \in \{1, 3, 5\}$. At inference time, the full VLM 120 is kept frozen, and the ability of the self-context adaptation to digest new in-context sequences is tested. Previously unseen few-shot tasks are considered, which also have a support set as context 116, and a query 118 to evaluate the performance. Specifically, the VLM 120 generates the category for each query 118 set sample in an open-ended autoregressive manner. To obtain the final output, beam-search is used to sample from the VLM 120 given the sequence of context samples.

Experimental Setup

To pre-train an image captioning model and to perform the clustering part, the Conceptual Captions (CC3M) dataset were used. At the inference stage, the multimodal few-shot datasets proposed by Frozen was used, namely Real-Names miniImageNet and Open-Ended miniImageNet with 2 and 5-way tasks, each one with 1, 3 and 5 shots.

Figure 3:
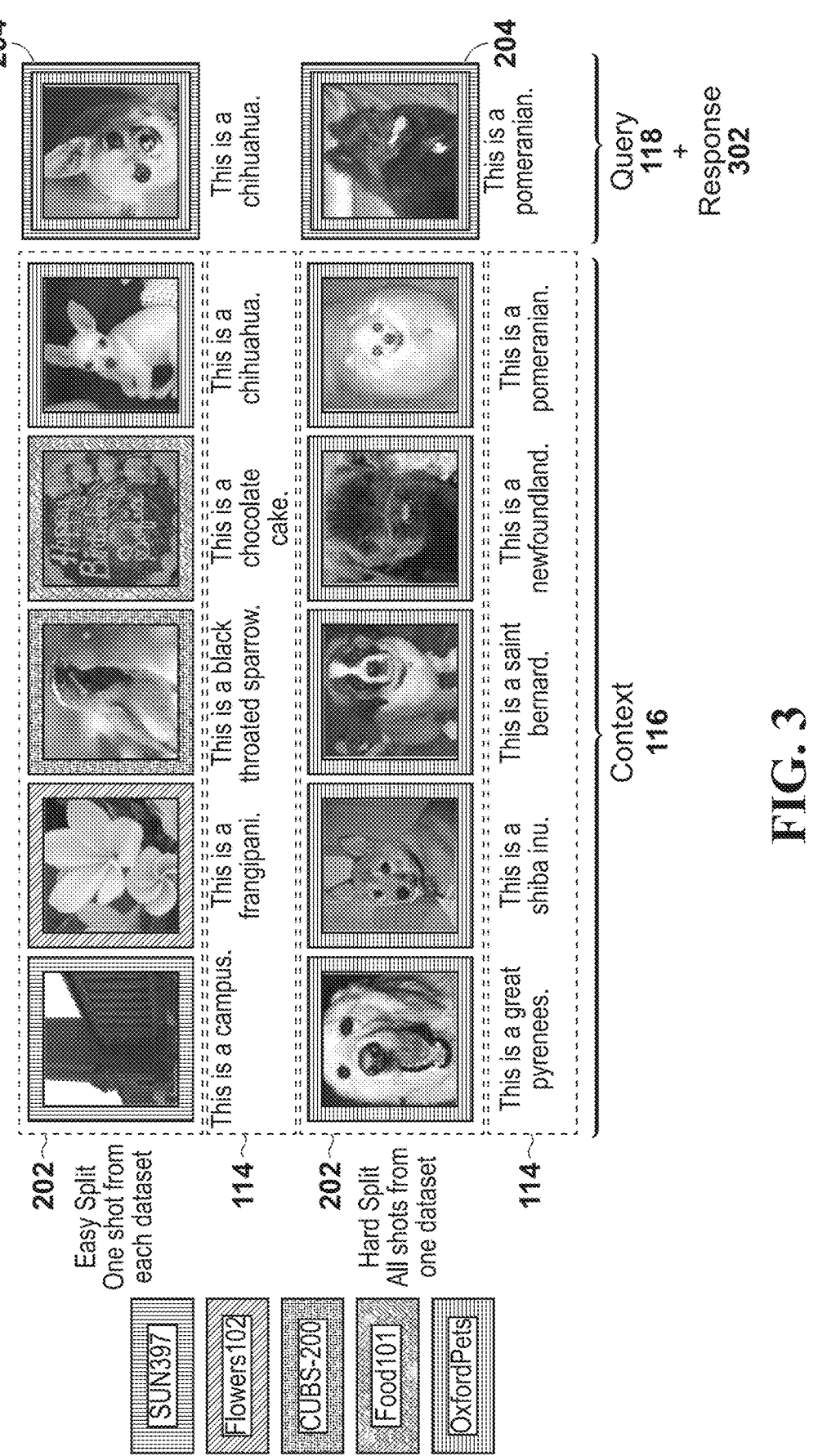
FIG. 3 depicts example datasets representing "easy" and "hard" categorization tasks for the visual language model of FIG. 1, according to an example embodiment.

Additionally, two multimodal few-shot datasets were created by combining existing ones, namely OxfordPets [13], Flowers102 [12], Food101 [4], CUBS-200 and SUN397 [18], as depicted in FIG. 3. The goal of this step was to test the ability of the ICL adaptation method 100 to generalize across fine-grained and coarse-grained settings by creating semantically "easy" and "hard" datasets. For the semantically-easy split, in the context of an n-ways k-shots scenario, n datasets from the pool of five datasets were randomly chosen. Subsequently, from each selected dataset, a single class to constitute the n-ways setting was randomly selected. For the semantically-hard split, one dataset was randomly selected, followed by the selection of n classes from the chosen dataset. Finally, from chosen classes, k-image samples were randomly chosen. The particular example shown in FIG. 3 shows a 5-way 1-shot task from the easy split in the top row, with a shot per dataset; and a 5-way 1-shot task from the hard split in the bottom row, where all the shots are selected from one dataset. For both splits, FIG. 3 highlights the context 116 comprising the context images 202 and captions 114, the query 118 comprising the query images and the "This is a . . . " text string 206 (not labeled in FIG. 3), and the response 302 ("chihuahua" for the easy split, and "pomeranian" for the hard split).

The language backbone of the VLM 120 was based on the OPT-family of models, namely GPT-Neo model [5] as the largest one, and the smaller versions, such as GPT2-small and GPT2-medium. For the visual component of the VLM 120, the vision encoder of a pre-trained CLIP ViT-B/32 model was used, due to its strong ability to produce visual representations useful for vision and language tasks [10]. To implement the deep clustering stage, the faiss library [6] was used, particularly the k-means algorithm with 10 iterations.

Figure 2:
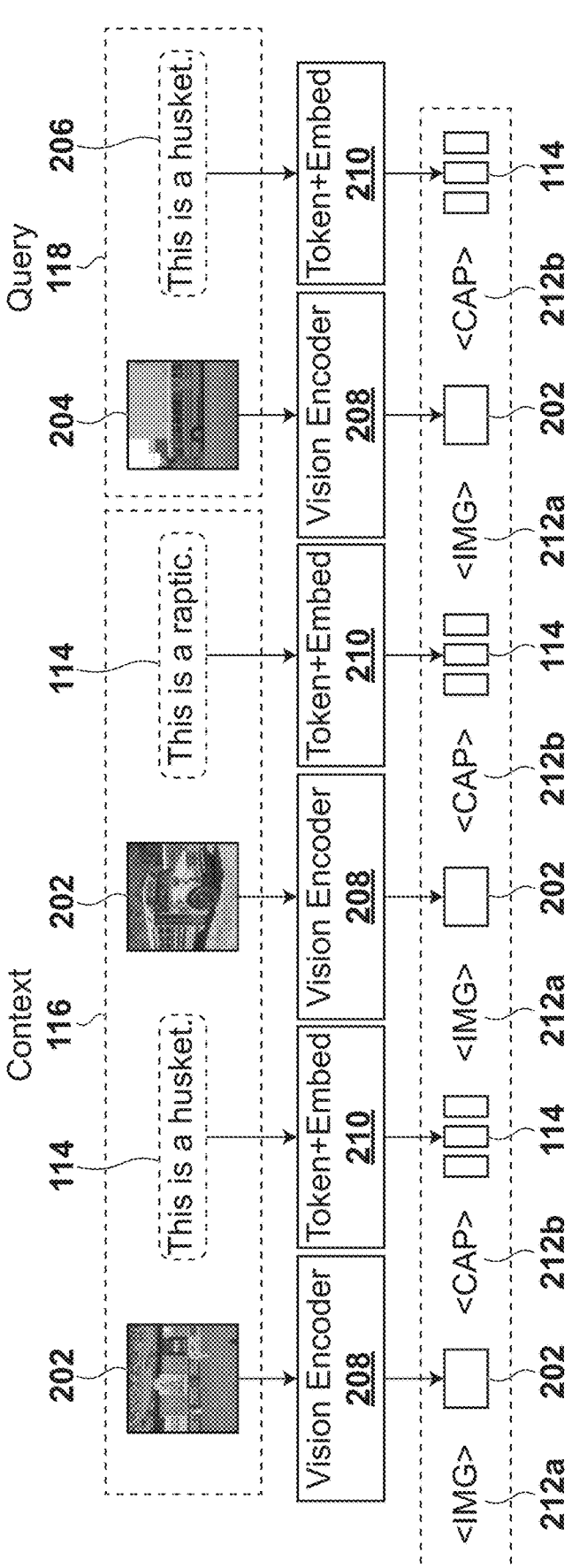
FIG. 2 depicts how the context used by the visual language model of FIG. 1 to perform image categorization is generated, according to an example embodiment.

To ensure that the VLM 120 correctly paid attention to the image 202 and caption 114 during training, special tokens, an image token 212a <IMG> and a caption token 212b <CAP>, were added in the prompt before the image 202 and caption 114 respectively. This is depicted in FIG. 2 and helped the VLM 120 to focus on attending to the correct image and text within the interleaved prompt sequence. More particularly, FIG. 2 depicts how the context 116 used by the VLM 120 to perform image categorization is generated. In FIG. 2, the context 116 is a 2-way (i.e., two different image categories), 1-shot (i.e., one example in the context 116 corresponding to the same category of image as the query 118) self-context sequence. As described in respect of FIG. 1, the context 116 comprises images, referred to as context images 202, and corresponding captions 114. The vision encoder 208 is used to generate visual embeddings of the context images 202, and the tokenizer embedding function 210 is used to generate word embeddings of the captions 114. The context 116 is presented as a sequence of interleaved pairs of the context images 202 and corresponding captions 114. Immediately preceding the context images 202 and captions 114 in the context 116 are the image tokens 212a and caption tokens 212b, respectively. These tokens 212a,b denote the positions of the elements (i.e., the context images 202 and corresponding captions 114) in the sequence.

Appended to the context 116 in FIG. 2 is the query 118. The query 118 comprises the query image 204 and the text string 206 ("This is a . . . " in FIG. 2) shared by the captions 114 in the context 116. The image and caption tokens 212a,b also precede the query image 204 and text string 206 in the query 118, and the appended context 116 and query 118 are presented as input to the VLM 120.

The VLMs 120 were trained using mixed-precision with bfloat16 [1]. In the image captioning pre-training stage, a batch size of 160 over 370,000 iterations and 3 Nvidia A6000™ GPUs were used. Furthermore, the AdamW optimizer [7] with a learning rate of 2e-5 and a warmup of 5000 steps was used. The visual prefix length was set to 5 and the word embedding dimension was set to 2048. During the self-context adaptation stage, the language backbone was only fine tuned with a small learning rate of 5e-6 for 50 epochs and all other components were kept fixed. The approach was evaluated in an open-ended fashion, by measuring the accuracy (%) of generating the words which matched the ground-truth. The full implementation was implemented in PyTorch™ and HuggingFace™.

Experimental Results and Discussion

In multimodal scenarios, fast concept binding pertains to the ability of the VLM 120 to learn the connection between visual concepts and words by observing only a few demonstrations. The experiments in Table 1 for open-ended image categorization, measure to what extent the ICL adaptation method 100 was able to perform such binding with VLMs 120 of 1.3 B parameters. The experiments covered 2 and 5 ways, each one with 1 and 5 shots. It can be observed that the ICL adaptation method 100 outperformed models which are even 5× its size, such as Frozen [16] and FRO-MAGe [8]. This shows that small models can indeed be adapted to be good in-context learners in a fast and efficient manner. OpenFlamingo [3] was viewed as an upper-bound of the ICL adaptation method 100 since it is pre-trained on web-scraped interleaved sequences of images and text, which directly helps in-context learning abilities. Unlike OpenFlamingo, large-scale pre-training was not performed on such a dataset, but rather the aim was to simulate it by using the ICL adaptation method 100.

The flexibility of the ICL adaptation method 100, to select clusters 110 with a particular distance and label them in a self-supervised manner, allows the handling of both fine-grained and coarse-grained few-shot tasks. In Table 2, the performance on easy and hard dataset splits is demonstrated, revealing the ability of the ICL adaptation method 100 to adapt to different levels of difficulty. As expected, it was easier for the VLM 120 to adjust to the easy-split settings, compared to the hard-split. Similarly as in Table 1, the ICL adaptation method 100 was able to outperform FROMAGe [8], across all few-shot settings, even though it was using a notably smaller language VLM 120. Table 2 shows that the ICL adaptation method 100 better adjusted to easy-to-hard dataset splits than 5× larger FROMAGe model. This means that VLMs 120 can indeed benefit from having the ICL adaptation method 100 as an efficient in-context learning adaptation step.

image to the relevant words, and was able to produce a response 302 in the form of school bus as output. In contrast to this, ClipCap generates an incorrect caption, not related to the query image, showing the lack of in-context learning ability in small visual language models, without the ICL adaptation method 100. FROMAGe was able to capture the concept of school bus as a prediction, but was excessively verbose. This essentially means that FROMAGe was leveraging its semantic priors from the image captioning pre-training and not entirely adapting to the context sequence.

Ablations

The ICL adaptation method 100 is sufficiently flexible to vary the difficulty of the self-context construction. This means that it can use cluster centroids in small proximity or further apart from each other, which influences the semantics of the chosen visual concepts within the self-context. Three different variants were considered regarding this, by computing L2 distances between all centroids and taking the most similar 5% as a "hard" setting and the 5% least similar as an "easy" one. The clusters 110 were shuffled from both hard and easy settings to obtain "varying" difficulty. As can

TABLE 1

Baselines comparison on 2- and 5-way Real-Name miniImageNet
and Open-Ended miniImageNet in accuracy (%)

| | | Real-Name miniImageNet | | | | Open-Ended miniImageNet | | | |
| | | 2-way | | 5-way | | 2-way | | 5-way | |
| Methods | #params | 1-shot | 5-shot | 1-shot | 5-shot | 1-shot | 5-shot | 1-shot | 5-shot |
| --- | --- | --- | --- | --- | --- | --- | --- | --- | --- |
| Frozen [16] | 7B | 33.7 | 66.0 | 14.5 | 33.8 | 53.4 | 58.9 | 51.1 | 58.5 |
| FROMAGe [8] | 6.7B | 31.0 | 50.4 | 17.5 | 30.7 | 27.8 | 49.8 | 16.3 | 19.5 |
| ICL Adaptation Method 100 | 1.3B | 85.7 | 83.2 | 68.6 | 58.0 | 87.4 | 85.6 | 68.0 | 41.9 |
| OpenFlamingo [3] | 9B | 62.0 | 95.9 | 45.3 | 91.2 | 45.2 | 63.4 | 15.0 | 56.9 |

TABLE 2

Generalization from easy-to-hard on the 2- and 5-way Easy vs Hard dataset splits in accuracy (%)

| | | Easy split | | | | Hard split | | | |
| | | 2-way | | 5-way | | 2-way | | 5-way | |
| Methods | #params | 1-shot | 5-shot | 1-shot | 5-shot | 1-shot | 5-shot | 1-shot | 5-shot |
| --- | --- | --- | --- | --- | --- | --- | --- | --- | --- |
| FROMAGe [8] | 6.7B | 30.0 | 50.1 | 13.8 | 28.3 | 28.6 | 46.6 | 10.0 | 23.5 |
| ICL Adaptation Method 100 | 1.3B | 81.3 | 65.2 | 70.5 | 49.7 | 63.8 | 52.6 | 34.7 | 26.2 |
| OpenFlamingo [3] | 9B | 53.3 | 98.9 | 37.8 | 98.8 | 39.9 | 90.3 | 25.9 | 78.0 |

Figure 4:
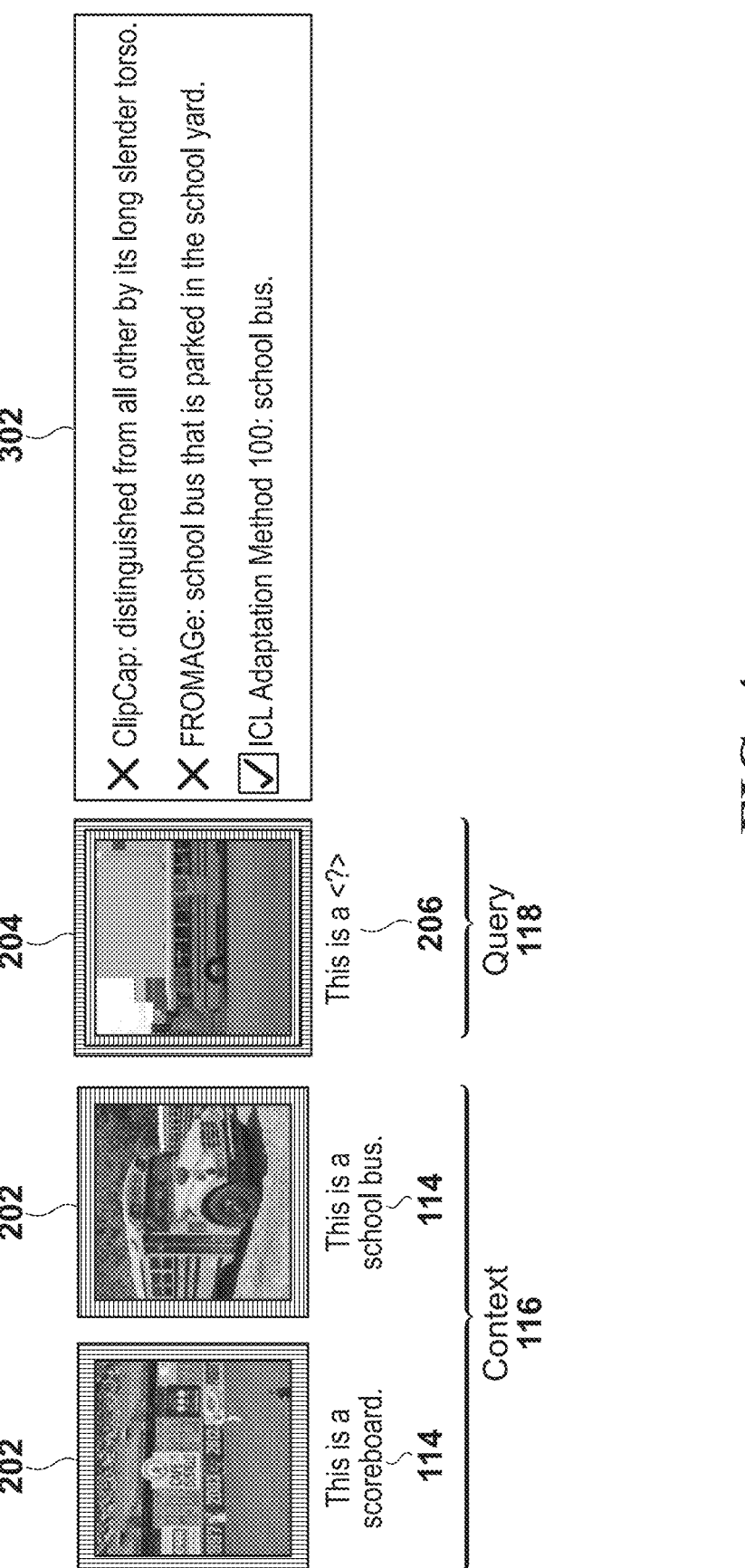
FIG. 4 depicts a qualitative comparison between the method for image categorization using a visual language model according to an example embodiment, and two caption generation methods.

FIG. 4 shows an example of a 2-way 1-shot few-shot learning task from Real-Names miniImageNet, with an interleaved image-caption sequence as the context 116, comprising a pair of context images 202 and corresponding captions 114; and the query 118, comprising the query image 204 and the text string 206 ("This is a . . . "). The generated output was obtained by feeding this sequence in the VLM 120 in accordance with the ICL adaptation method 100 and the baseline models, namely ClipCap and FROMAGe. It can be seen that when the ICL adaptation method 100 is applied, the VLM 120 successfully connected visual concepts in the be observed from Table 3 (a), the ICL adaptation method 100 benefited from varying the proximity between cluster centroids. The performance on hard difficulty was substantially lower compared to the other two, since the model dealt with images clustered closely to each other which means there was probably no large variability among them.

For the selection of the semantically-unrelated names 112 used for labeling the clusters 110 and then generating the captions of images 202, either nonsense words, random numbers, or random nouns were used. The nonsense words are taken using a nonsense-word generator similar to [16].

The random numbers and nouns were generated in a similar manner, and they were semantically-unrelated to the clustered images 202. Table 3(b) shows the performance of the ICL adaptation method 100 when using these types of names 112 on the Real-Name miniImageNet, across different few-shot settings. It can be seen that the random nouns yielded better performance compared to the random numbers and nonsense names. Interestingly, the VLM 120 achieved satisfactory performance even though the cluster names 112 were not related to the images 202, which means that probably any word embedding is good enough for the VLM 120 to learn a self-context.

The impact of name-matching techniques is explored in Table 3(c), where random cluster-name matching and cost-based matching are compared. In the random cluster-name matching variant, the name embeddings were randomly assigned to cluster centroids. The cost-based matching variant utilizes the Kuhn-Munkres (Hungarian) algorithm, which aimed to find the minimal distance between cluster centroids and name embeddings. It can be observed that using the cost-based matching approach yielded better performance, which means that the ICL adaptation method 100 benefits from a more informed manner of cluster naming.

To evaluate the influence of varying self-context length, two adaptation strategies were considered. The first strategy, denoted as single-task, was simply using a fixed number of samples in the self-context across all mini-batches, where 2-way 1-shot tasks were considered. The second strategy was the mixed self-context training, where the number of samples by using 2-way and j-shot tasks was randomly varied, where $j \in \{1, 3, 5\}$. Comparing the two strategies in Table 3(d) revealed that mixed self-context training consistently outperformed the single one by a significant margin, especially when the number of shots increased. This is mainly attributed to the fact that the mixed training paradigm lets the VLM observe different lengths of the self-context sequences. In Tables 3(a)-(d), evaluations are done on the 2- and 5-way Real-Name miniImageNet with the best model from Table 1.

Tables 3(a)-(d): Ablations. (a) Effect of Varying Self-Context Difficulty; (b) Influence of Different Semantically-Unrelated Names; (c) Matching of Names to Cluster Centroids; and (d) Benefit of Mixed Self-Context Training.

(a) Effect of varying self-context difficulty.

| difficulty | 2-way | | 5-way | |
| --- | --- | --- | --- | --- |
| | 1-shot | 5-shot | 1-shot | 5-shot |
| hard | 32.6 | 39.4 | 14.9 | 8.6 |
| easy | 82.2 | 81.8 | 52.5 | 29.8 |
| varying | 85.7 | 83.2 | 68.6 | 58.0 |

(b) Influence of different semantically-unrelated names.

| vocab | 2-way | | 5-way | |
| --- | --- | --- | --- | --- |
| | 1-shot | 5-shot | 1-shot | 5-shot |
| nonsense | 77.2 | 69.7 | 55.7 | 10.3 |
| numbers | 81.6 | 54.8 | 49.4 | 24.9 |
| nouns | 85.7 | 83.2 | 68.6 | 58.0 |

(c) Matching of names to cluster centroids.

| matching | 2-way | | 5-way | |
| --- | --- | --- | --- | --- |
| | 1-shot | 5-shot | 1-shot | 5-shot |
| random | 81.8 | 83.2 | 68.7 | 40.7 |
| cost-based | 85.7 | 83.2 | 68.6 | 58.0 |

(d) Benefit of mixed self-context training.

| setting | 2-way | | 5-way | |
| --- | --- | --- | --- | --- |
| | 1-shot | 5-shot | 1-shot | 5-shot |
| single-task | 73.3 | 25.1 | 35.2 | 3.6 |
| mixed-task | 85.7 | 83.2 | 68.6 | 58.0 |

In respect of small VLMs 120, the objective of the ICL adaptation method 100 is to turn those small models (i.e., models with a small language backbone) into good in-context learners. To investigate this scenario, the GPT-Neo backbone was replaced with its smaller alternatives, namely GPT2-small (124 M parameters) and GPT2-medium (355 M parameters), and the performance is reported in Table 4. Although the best performance was obtained with the largest variant GPT-Neo, the two smaller alternatives also showed promising results, especially taking into account the huge difference in size. The good performance of the GPT-Neo variant with 1.3 B parameters reasonably evidences the applicability of the ICL adaptation method 100 to even larger networks, such as those with more 2 billion parameters. The baselines considered in Table 1 have at least 5 times more parameters. Additionally, in at least some embodiments the ICL adaptation method 100 can be trained within 14 hours, which is in contrast to FROMAGe [8], which requires a training time of 24 hours. This time efficiency is beneficial in scenarios where fast model adaptation is desired or when limited computational resources are available. Table 4 shows that increasing the number of parameters leads to improved few-shot learning performance on the Real-Name miniImageNet dataset.

TABLE 4

Few-shot performance using different ICL adaptation method 100-trained language model backbones, with varying sizes

| LM variants | #params | time (hours) | 2-way | | | 5-way | | |
| --- | --- | --- | --- | --- | --- | --- | --- | --- |
| | | | 1-shot | 3-shot | 5-shot | 1-shot | 3-shot | 5-shot |
| GPT2-small | 124M | 6 h | 26.9 | 53.2 | 54.3 | 37.5 | 31.4 | 33.1 |
| GPT2-medium | 355M | 11 h | 56.2 | 55.9 | 64.2 | 42.4 | 40.6 | 41.7 |
| GPT-Neo | 1.3B | 14 h | 85.7 | 88.2 | 83.2 | 68.6 | 59.3 | 58.0 |

Accordingly, in at least some embodiments the ICL adaptation method 100 is a self-supervised learning approach able to unlock in-context learning abilities in small visual language models 120 and able to improve in-context learning abilities that may already be present to a certain degree in larger models. The ICL adaptation method 100 is relatively lightweight and can transform small-scale models into strong in-context learners. In at least some example embodiments, it does so by leveraging clustering to group unlabelled images 202 and assign semantically-unrelated names 112 to these clusters 110, simulating image captions 114. This yields sequences of self-contexts which are used as inputs to the VLM 120 to further adapt it to easily capture patterns and dependencies within the presented context 116. Experiments confirmed that the ICL adaptation method 100 can teach VLMs 120 how to digest multimodal contexts, even by using VLMs 120 which do not immediately exhibit in-context learning abilities. The ICL adaptation method 100 also demonstrates efficiency in terms of data and training resources, contributing to the advancement of multimodal learning that is otherwise closed to individuals without access to large, proprietary models.

Figure 5:
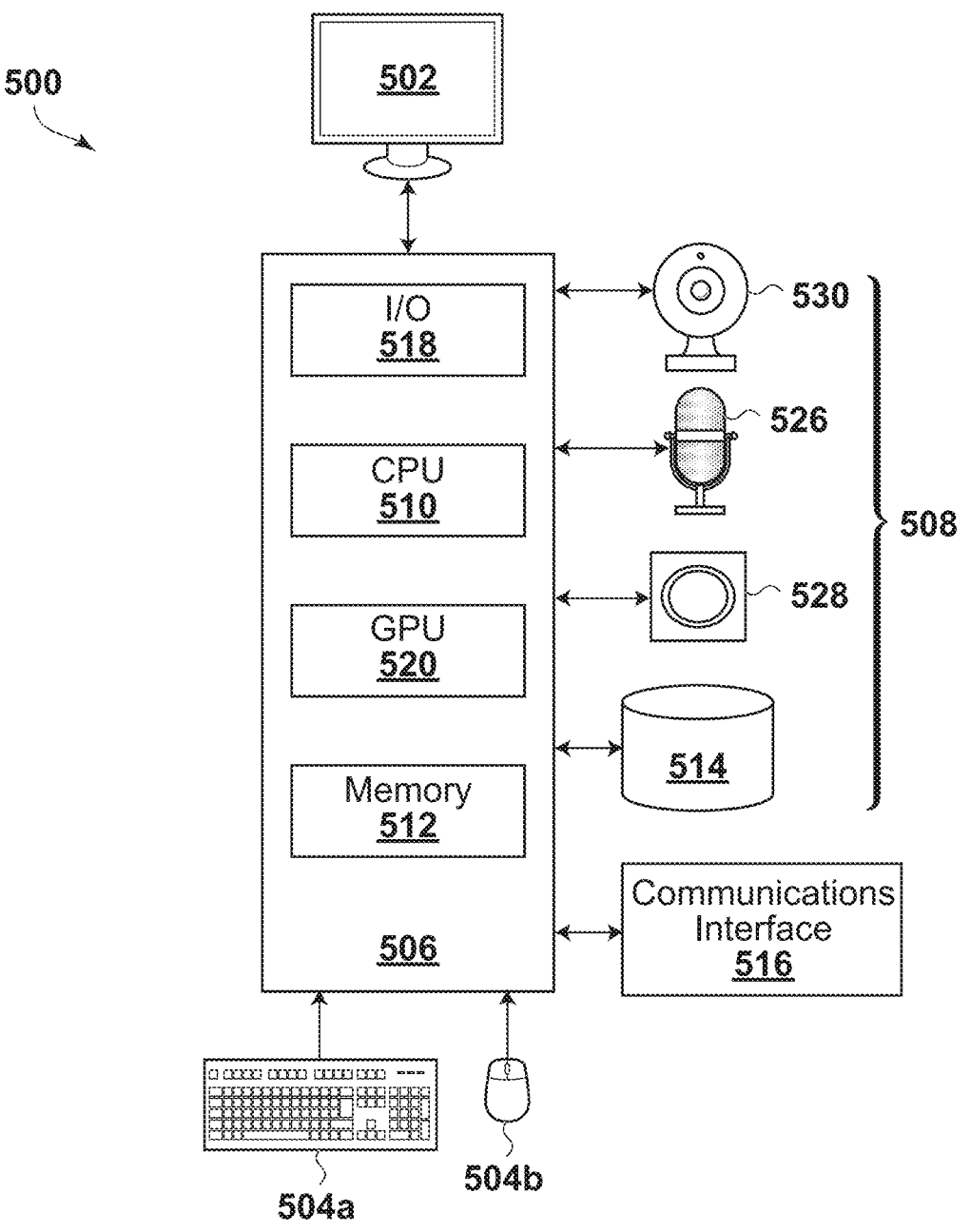
FIG. 5 depicts an example computer system that may be used to implement the method for image categorization using a visual language model, according to an example embodiment.

An example computer system in respect of which the ICL adaptation method 100 described above may be implemented is presented as a block diagram in FIG. 5. The example computer system is denoted generally by reference numeral 500 and includes a display 502, input devices in the form of keyboard 504a and pointing device 504b, computer 506 and external devices 508. While pointing device 504b is depicted as a mouse, it will be appreciated that other types of pointing device, or a touch screen, may also be used.

The computer 506 may contain one or more processors or microprocessors, such as a central processing unit (CPU) 510. The CPU 510 performs arithmetic calculations and control functions to execute software stored in a non-transitory internal memory 512, preferably random access memory (RAM) and/or read only memory (ROM), and possibly storage 514. The storage 514 is non-transitory may include, for example, mass memory storage, hard disk drives, optical disk drives (including CD and DVD drives), magnetic disk drives, magnetic tape drives (including LTO, DLT, DAT and DCC), flash drives, program cartridges and cartridge interfaces such as those found in video game devices, removable memory chips such as EPROM or PROM, emerging storage media, such as holographic storage, or similar storage media as known in the art. This storage 514 may be physically internal to the computer 506, or external as shown in FIG. 5, or both. The storage 514 may also comprise a database for storing a set of images as described above. For example, the datasets used in the experiments described above may be stored in such a database and retrieved for use in training.

The one or more processors or microprocessors may comprise any suitable processing unit such as an artificial intelligence accelerator, programmable logic controller, a microcontroller (which comprises both a processing unit and a non-transitory computer readable medium), AI accelerator, system-on-a-chip (SoC). As an alternative to an implementation that relies on processor-executed computer program code, a hardware-based implementation may be used. For example, an application-specific integrated circuit (ASIC), field programmable gate array (FPGA), or other suitable type of hardware implementation may be used as an alternative to or to supplement an implementation that relies primarily on a processor executing computer program code stored on a computer medium.

Any one or more of the methods described above may be implemented as computer program code and stored in the internal memory 512 and/or storage 514 for execution by the one or more processors or microprocessors to effect neural network pre-training, training, or use of a trained network for inference.

The computer system 500 may also include other similar means for allowing computer programs or other instructions to be loaded. Such means can include, for example, a communications interface 516 which allows software and data to be transferred between the computer system 500 and external systems and networks. Examples of communications interface 516 can include a modem, a network interface such as an Ethernet card, a wireless communication interface, or a serial or parallel communications port. Software and data transferred via communications interface 516 are in the form of signals which can be electronic, acoustic, electromagnetic, optical or other signals capable of being received by communications interface 516. Multiple interfaces, of course, can be provided on a single computer system 500.

Input and output to and from the computer 506 is administered by the input/output (I/O) interface 518. This I/O interface 518 administers control of the display 502, keyboard 1304a, external devices 508 and other such components of the computer system 500. The computer 506 also includes a graphical processing unit (GPU) 520. The latter may also be used for computational purposes as an adjunct to, or instead of, the CPU 510, for mathematical calculations.

The external devices 508 include a microphone 526, a speaker 528 and a camera 530. Although shown as external devices, they may alternatively be built in as part of the hardware of the computer system 500. For example, the camera 530 and microphone 526 may be used to retrieve multi-modal content for use in training or at inference/test-time.

The various components of the computer system 500 are coupled to one another either directly or by coupling to suitable buses.

The term "computer system", "data processing system" and related terms, as used herein, is not limited to any particular type of computer system and encompasses servers, desktop computers, laptop computers, networked mobile wireless telecommunication computing devices such as smartphones, tablet computers, as well as other types of computer systems.

The embodiments have been described above with reference to flow, sequence, and block diagrams of methods, apparatuses, systems, and computer program products. In this regard, the depicted flow, sequence, and block diagrams illustrate the architecture, functionality, and operation of implementations of various embodiments. For instance, each block of the flow and block diagrams and operation in the sequence diagrams may represent a module, segment, or portion of code, which comprises one or more executable instructions for implementing the specified action(s). In some alternative embodiments, the action(s) noted in that block or operation may occur out of the order noted in those figures. For example, two blocks or operations shown in succession may, in some embodiments, be executed substantially concurrently, or the blocks or operations may sometimes be executed in the reverse order, depending upon the functionality involved. Some specific examples of the foregoing have been noted above but those noted examples are not necessarily the only examples. Each block of the flow and block diagrams and operation of the sequence diagrams, and combinations of those blocks and operations, may be implemented by special purpose hardware-based systems that perform the specified functions or acts, or combinations of special purpose hardware and computer instructions.

The terminology used herein is for the purpose of describing particular embodiments only and is not intended to be limiting. Accordingly, as used herein, the singular forms "a", "an", and "the" are intended to include the plural forms as well, unless the context clearly indicates otherwise. It will be further understood that the terms "comprises" and "comprising", when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "connect" and variants of it such as "connected", "connects", and "connecting" as used in this description are intended to include indirect and direct connections unless otherwise indicated. For example, if a first device is connected to a second device, that coupling may be through a direct connection or through an indirect connection via other devices and connections. Similarly, if the first device is communicatively connected to the second device, communication may be through a direct connection or through an indirect connection via other devices and connections.

Phrases such as "at least one of A, B, and C", "at least one of A, B, or C", "one or more of A, B, and C", and "A, B, and/or C" are intended to include both a single item from the enumerated list of items (i.e., only A, only B, or only C) and multiple items from the list (i.e., A and B, B and C, A and C, and A, B, and C). Accordingly, the phrases "at least one of", "one or more of", and similar phrases when used in conjunction with a list are not meant to require that each item of the list be present, although each item of the list may be present.

It is contemplated that any part of any aspect or embodiment discussed in this specification can be implemented or combined with any part of any other aspect or embodiment discussed in this specification, so long as such those parts are not mutually exclusive with each other.

The scope of the claims should not be limited by the embodiments set forth in the above examples, but should be given the broadest interpretation consistent with the description as a whole.

It should be recognized that features and aspects of the various examples provided above can be combined into further examples that also fall within the scope of the present disclosure. In addition, the figures are not to scale and may have size and shape exaggerated for illustrative purposes.

REFERENCES

[1] Martin Abadi, Ashish Agarwal, Paul Barham, Eugene Brevdo, Zhifeng Chen, Craig Citro, Greg S Corrado, Andy Davis, Jeffrey Dean, Matthieu Devin, et al. Tensorflow: Large-scale machine learning on heterogeneous distributed systems. arXir preprint arXiv: 1603.04467, 2016.

[2] Jean-Baptiste Alayrac, Jeff Donahue, Pauline Luc, Antoine Miech, Iain Barr, Yana Hasson. Karel Lenc, Arthur Mensch, Katherine Millican, Malcolm Reynolds, et al. Flamingo: a. visual language model for few-shot learning. Advances on Neural Information Processing Systems, 2022.

[3] Anas Awadalla, Irena Gao, Joshua Gardner, Jack Hessel, Yusuf Hanafy, Wanrong Zhu, Kalyani Marathe, Yonatan Bitton Samir Gadre, Jenia. Jitsev, Simon Komblith, Pang Wei Koh, Gabriel Ilharco, Mitchell Wortsman, and Ludwig Schmidt. Openflamingo, March 2023.

[4] Lukas Bossard, Matthieu Guillaumin, and Luc Van Gool. Food-101-mining discriminative components with random forests. In European Conference on Computer Vision, 2014.

[5] Leo Gao, Stella Biderman, Sid Black, Laurence Golding. Travis Hoppe, Charles Foster, Jason Phang, Horace He, Anish Thite, Noa. Nabeshima, et al. The pile: An 800 gb data.set of diverse text for language modeling. arXiv preprint arXiv:2101.00027, 2020.

[6] Jeff Johnson, Matthijs Douze, and Helve Jegou. Billion-scale similarity search with GPUs. IEEE Transactions on Big Data, 7(3):535-547, 2019.

[7] Diederik P Kingma and Jimmy Ba. Adam: A method for stochastic optimization. International Conference on Learning Representations, 2016.

[8] Jing Yu Koh, Ruslan Salakhutdinov, and Daniel Fried. Grounding language models to images for multimodal generation. arXiv preprint arXiv:2301.13823, 2023.

[9] Harold W Kuhn. The hungarian method for the assignment problem. Naval research logistics quarterly. 2(1-2): 83-97, 1955.

[10] Jack Merullo, Louis Castricato, Carsten Eickhoff, and Ellie Pavlick. Linearly mapping from image to text space. International Conference on Learning Representations, 2023.

[11] Ron Mokady, Amir Hertz, and Amit H Berman. Clipcap: Clip prefix for image captioning. arXiv preprint arXiv:2111.09734, 2021.

[12] Maria-Elena. Nilsback and Andrew Zisserman. Automated flower classification over a large number of classes. In Indian Conference on Computer Vision, Graphics & Image Processing, 2008.

[13] Omkar M Parkhi, Andrea Vedaldi, Andrew Zisserman, and C V Jawahar. Cats and dogs. In Conference on Computer Vision and Pattern Recognition, 2012.

[14] Alec Radford, Jong Wook Kim, Chris Hallacy, Aditya Ramesh, Gabriel Goh, Sanclhini Agar-wal, Girish Sastry, Amanda. Askell, Pamela Mishkin. Jack Clark, Gretchen Krueger, and Ilya Sutskever. Learning transferable visual models from natural language supervision. In International Conference on Machine Learning, 2021.

[15] Piyush Sharma, Nan Ding, Sebastian Goodman, and Radu Soricut. Conceptual captions: A cleaned, hypernymed, image alt-text dataset for automatic image captioning. In Annual Meeting of the Association for Computational Linguistics, 2018.

[16] Maria Tsimpoukelli, Jacob L Menick, Serkan Cabi, S M Eslami, Oriol Vinyals, and Felix Hill. Multimodal few-shot learning with frozen language models. In Ad, on Neural Information Processing Systems, 2021.

[17] Catherine Wah, Steve Branson, Peter Welinder, Pietro Perona, and Serge Belongie. The caltech-ucsd birds-200-2011 dataset. 2011.

[18] Jianxiong Xiao, James Hays, Krista A Ehinger, Aude Oliva, and Antonio Torralba. Sun database: Large-scale scene recognition from abbey to zoo. In Conference on Computer Vision and Pattern Recognition, 2010.

What is claimed is:

1. A method for image categorization using a visual language model, the method comprising:

(a) clustering a set of unlabeled images into clusters respectively corresponding to differently categorized objects;

(b) respectively assigning names to the clusters, wherein the names are semantically unrelated to each other;

(c) respectively generating image captions for the clusters using the names, wherein the image captions and respective images comprise image-text pairs;

(d) inputting the image-text pairs to the visual language model as context for a query; and (e) inputting the query to the visual language model, wherein the query comprises a request to categorize a query image of a class represented in the context and wherein the visual language model performs an open-ended generative categorization of the query image in response to the query.

2. The method of claim 1, wherein the visual language model is a small-scale visual language model.

3. The method of claim 2, wherein the visual language model has fewer than 2 billion parameters.

4. The method of claim 1, wherein the visual language model has between approximately 124 million parameters and approximately 1.3 billion parameters.

5. The method of claim 4, wherein the visual language model has approximately 355 million parameters.

6. The method of claim 1, wherein the names comprise nonsense words, random numbers, or random nouns.

7. The method of claim 6, wherein the names are random nouns.

8. The method of claim 1, wherein generating the image captions is performed in a self-supervised manner.

9. The method of claim 1, wherein the clustering comprises:

(a) generating visual embeddings of the set of unlabeled images; and (b) applying k-means clustering to the visual embeddings.

10. The method of claim 1, wherein generating the image captions comprises:

(a) respectively generating visual embeddings of centroids of the clusters using a vision encoder;

(b) generating word embeddings of the names of the clusters, wherein the word embeddings represent the names in a language model token-space; and (c) using a cost function to match the centroid from each of the clusters to the names based on the visual embeddings of the centroids and the word embeddings, wherein the images of any one of the clusters share one of the names.

11. The method of claim 1, wherein the image captions for the different clusters comprise a text string shared by all the clusters.

12. The method of claim 11, wherein the image captions respectively comprise the text string and the names appended together, and wherein the query comprises the text string.

13. The method of claim 1, wherein the visual language model comprises a vision encoder and a language mode, wherein inputting the image-text pairs to the visual language model comprises part of training the visual language model, and wherein parameters of the vision encoder are frozen during the training and parameters of the language model are adjusted during the training.

14. The method of claim 1, wherein the context comprises a sequence of interleaved pairs of the images and corresponding ones of the captions.

15. The method of claim 14, wherein the context further comprises tokens denoting positions of the images and the captions in the sequence.

16. The method of claim 1, wherein the context comprises a plurality of i-way j-shot tasks based on the clusters, and wherein similarity between the clusters of each of the tasks varies over the tasks.

17. The method of claim 1, wherein the context comprises a plurality of i-way j-shot tasks based on the clusters, and wherein j varies over the tasks.

18. A system for image categorization using a visual language model, the system comprising:

(a) at least one database having stored thereon a set of unlabeled images;

(b) at least one processor communicatively coupled to the at least one database; and (c) at least one non-transitory computer readable medium communicatively coupled to the at least one processor, wherein the computer readable medium has stored thereon computer program code that is executable by at least one processor and that, when executed by the at least one processor, causes the at least one processor to perform a method comprising:

(i) clustering the set of unlabeled images into clusters respectively corresponding to differently categorized objects;

(ii) respectively assigning names to the clusters, wherein the names are semantically unrelated to each other;

(iii) respectively generating image captions for the clusters using the names, wherein the image captions and respective images comprise image-text pairs;

(iv) inputting the image-text pairs to the visual language model as context for a query; and (v) inputting the query to the visual language model, wherein the query comprises a request to categorize a query image of a class represented in the context and wherein the visual language model performs an open-ended generative categorization of the query image in response to the query.

19. A non-transitory computer readable medium having stored thereon computer program code that is executable by at least one processor and that, when executed by the at least one processor, causes the at least one processor to perform a method for image categorization using a visual language model, the method comprising:

(a) clustering a set of unlabeled images into clusters respectively corresponding to differently categorized objects;

(b) respectively assigning names to the clusters, wherein the names are semantically unrelated to each other;

(c) respectively generating image captions for the clusters using the names, wherein the image captions and respective images comprise image-text pairs;

(d) inputting the image-text pairs to the visual language model as context for a query; and (e) inputting the query to the visual language model, wherein the query comprises a request to categorize a query image of a class represented in the context and wherein the visual language model performs an open-ended generative categorization of the query image in response to the query.

* * * * *